Patented Feb. 6, 1934

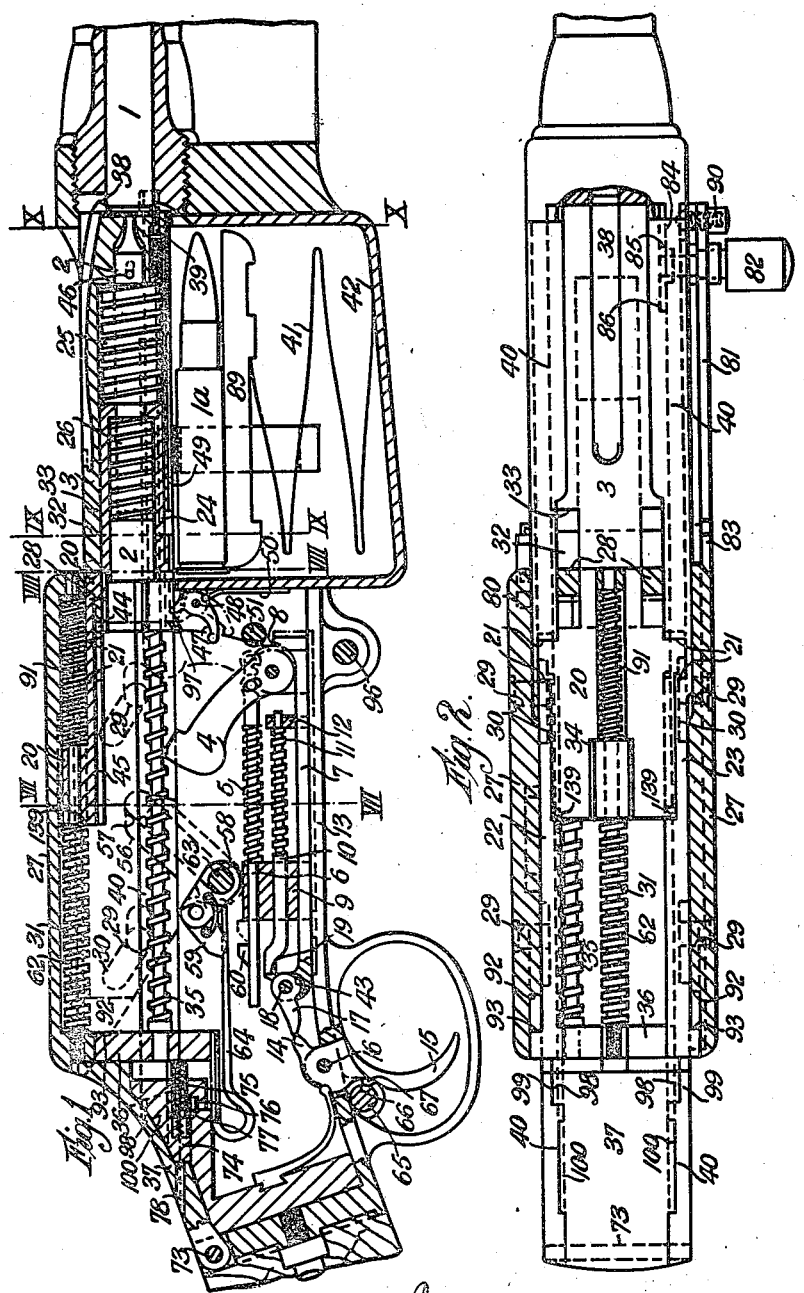

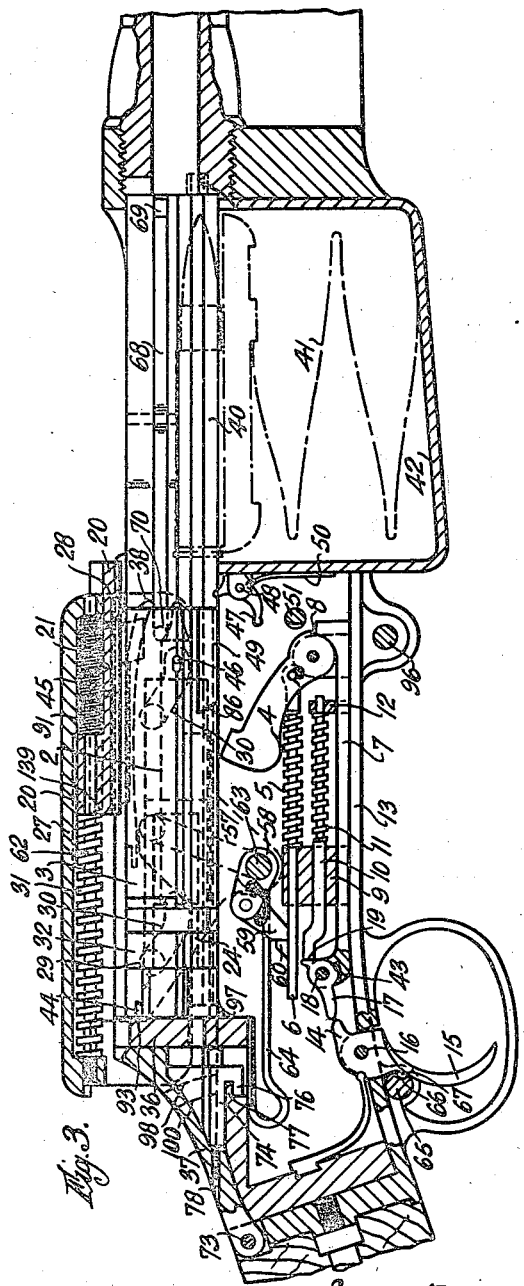

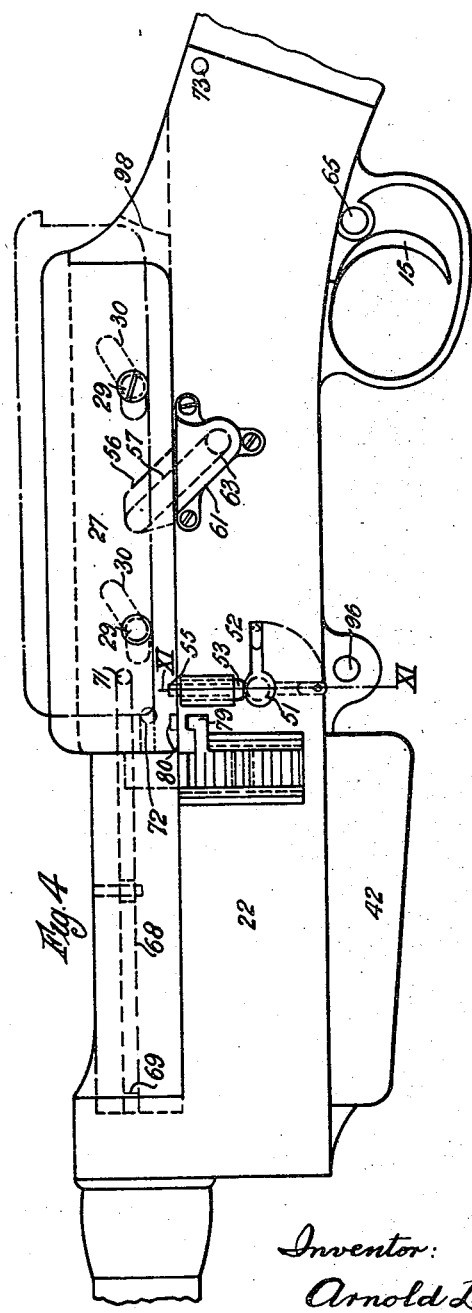

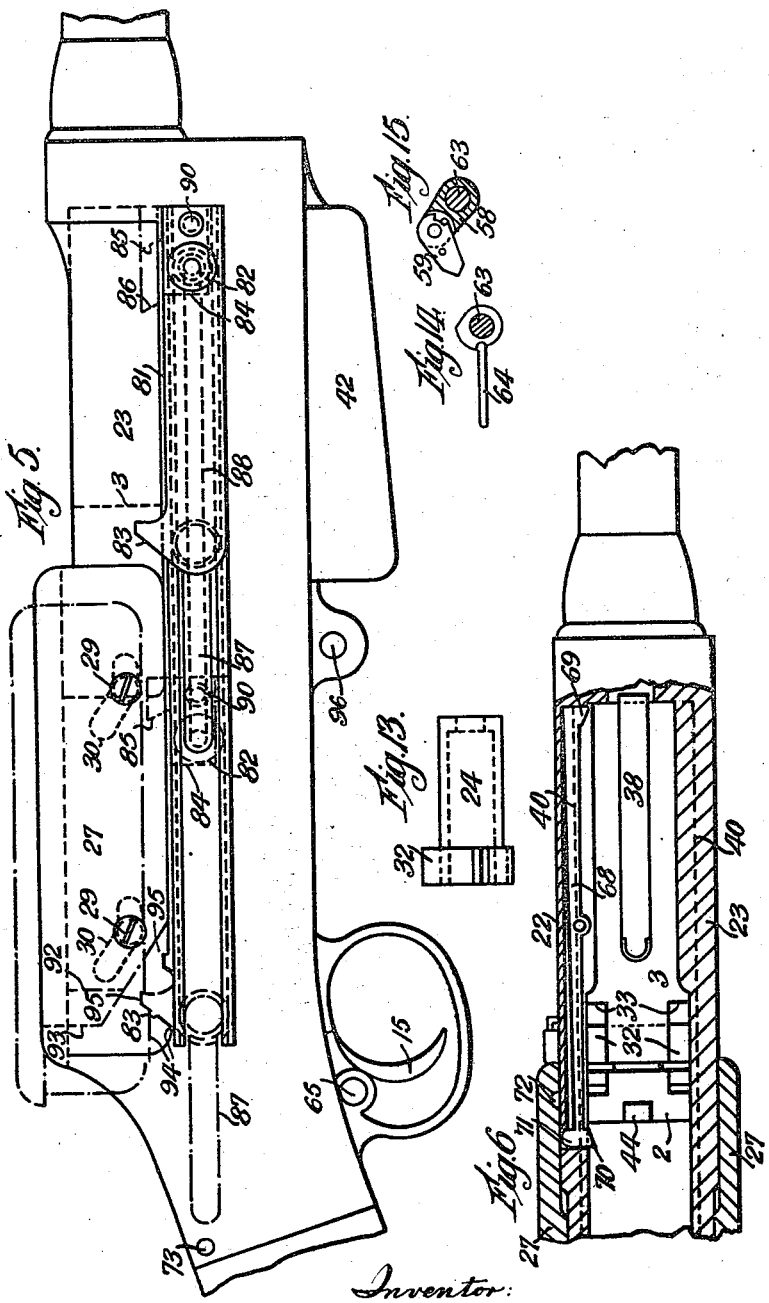

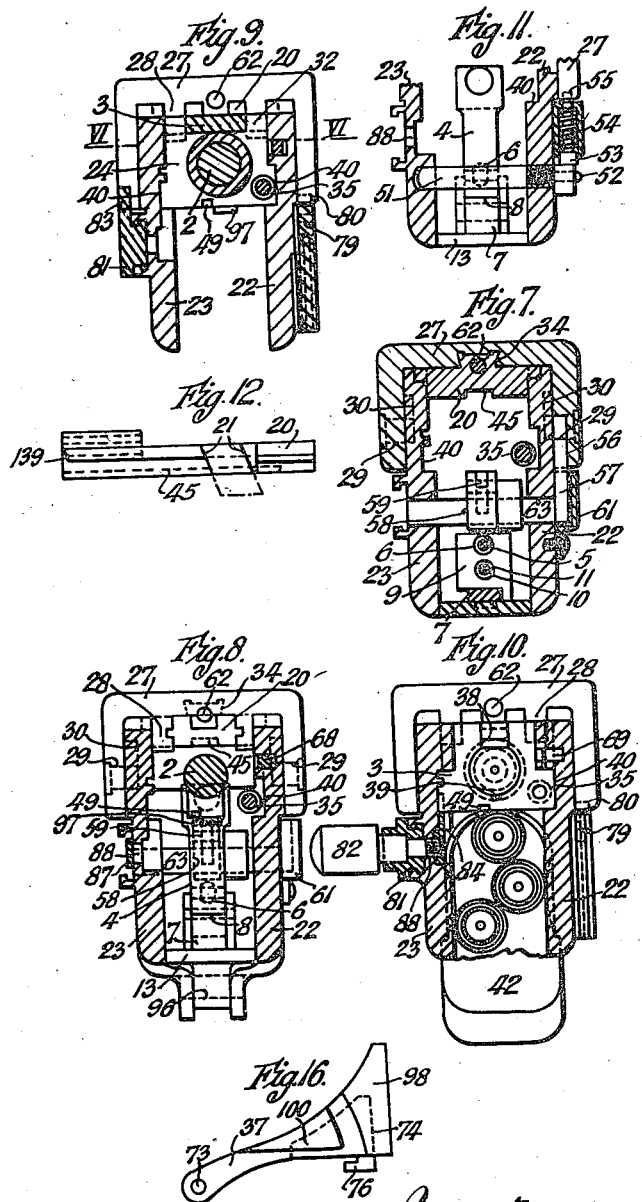

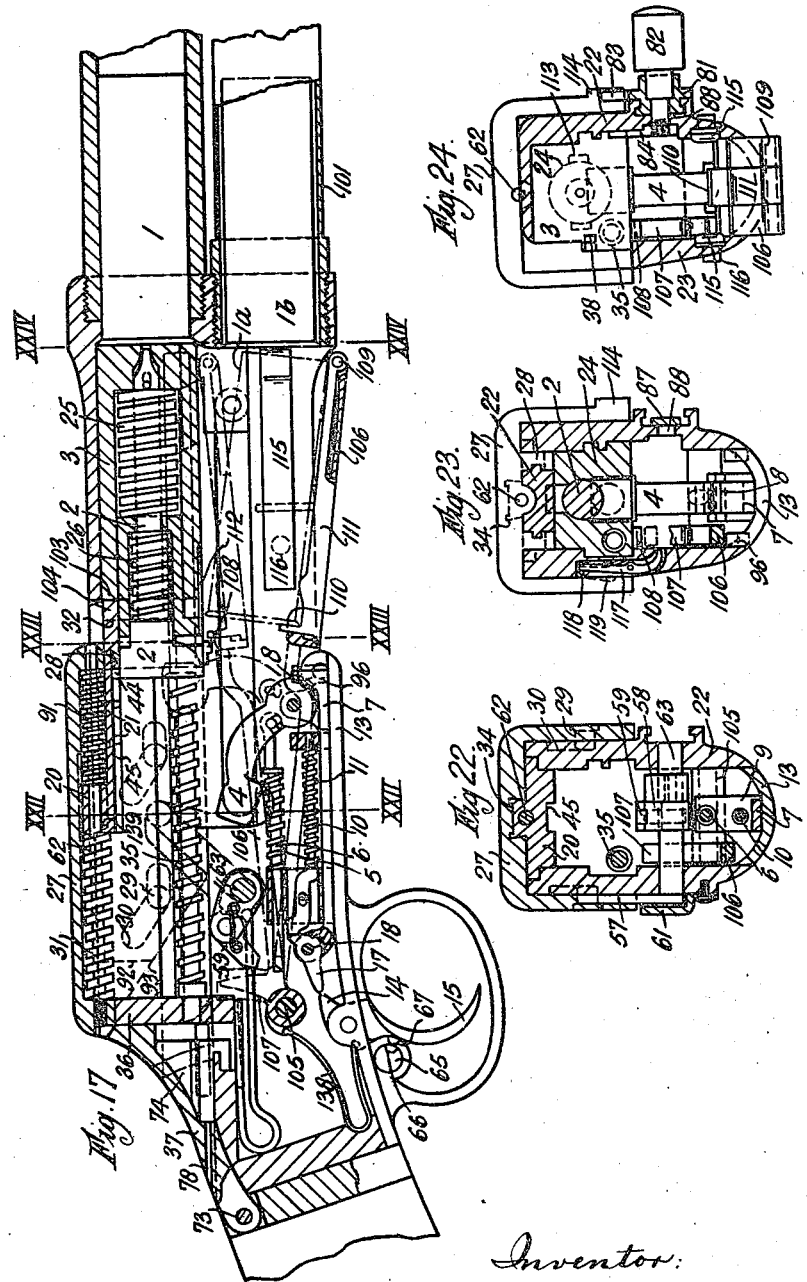

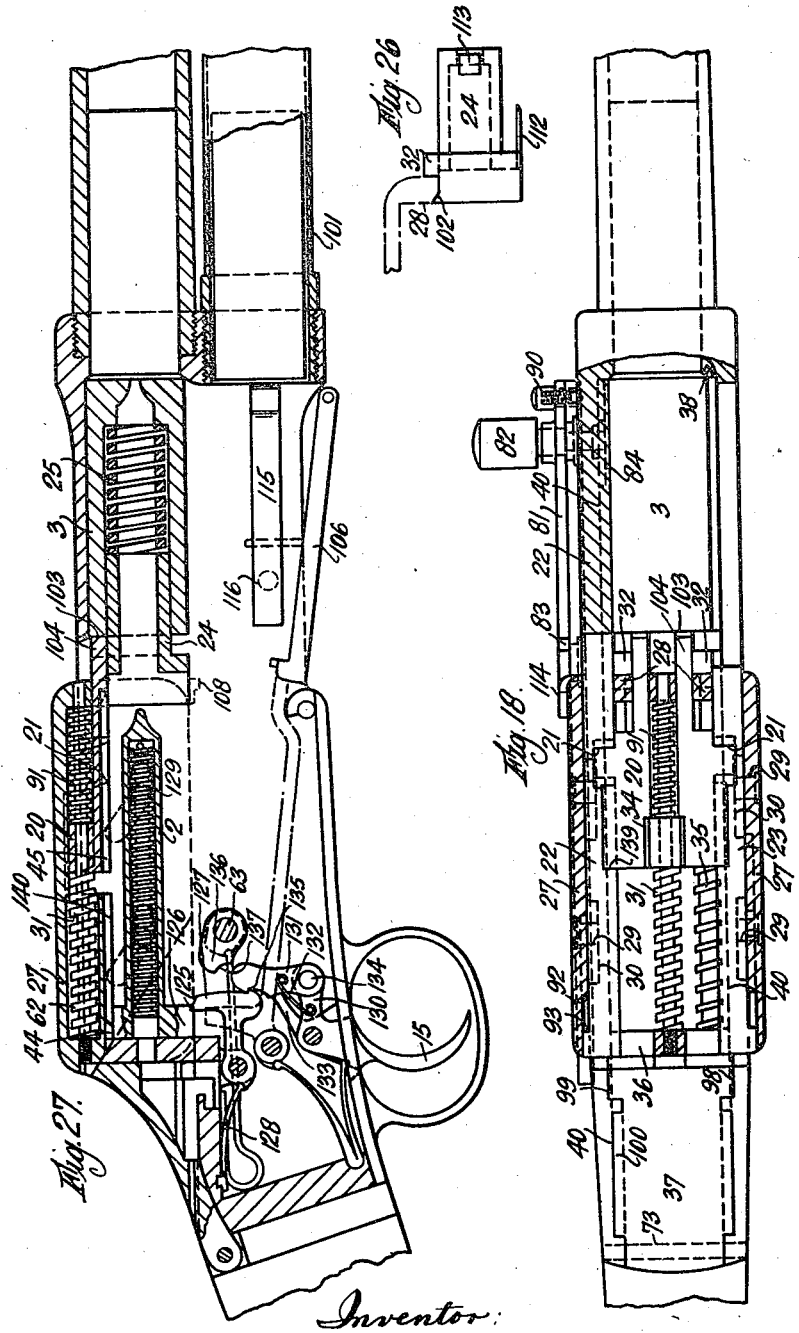

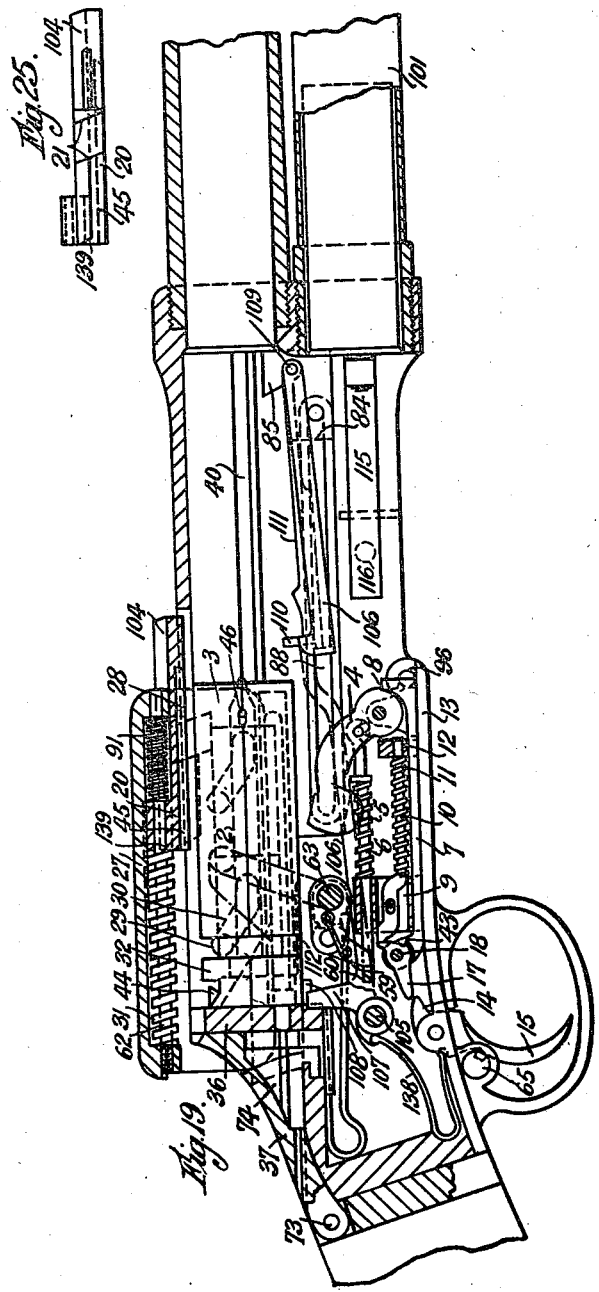

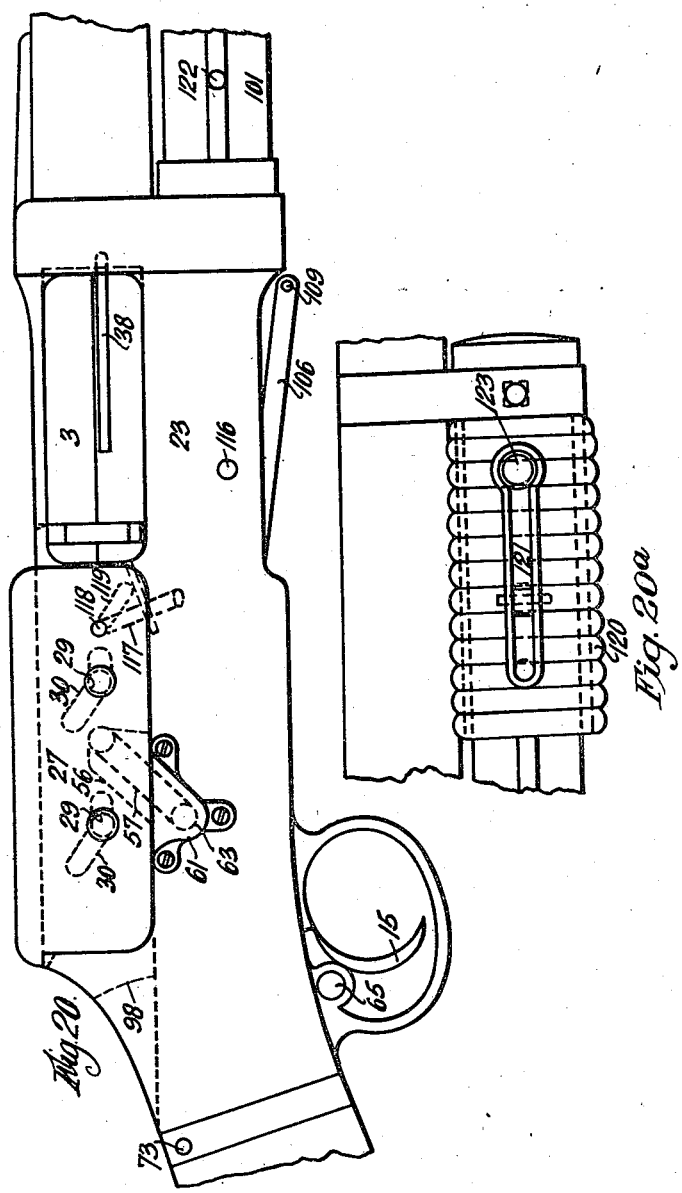

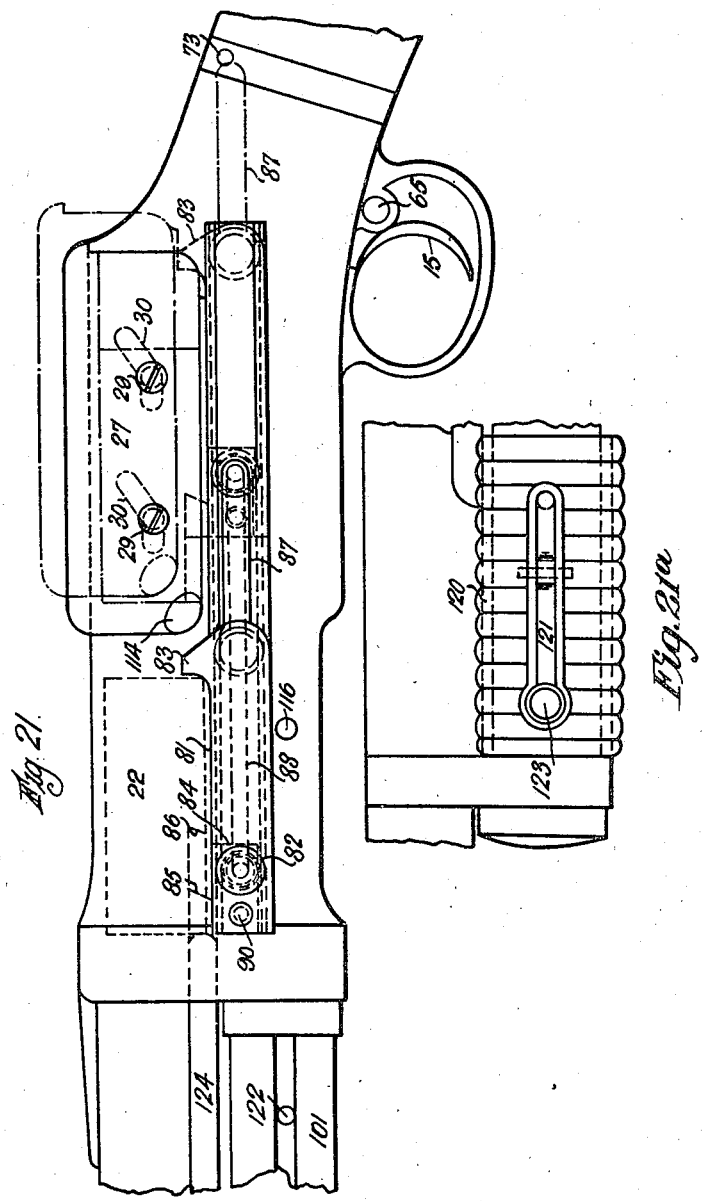

1,946,388

UNITED STATES PATENT OFFICE 1,946,388

RECOIL OPERATED SMALL ARM

Arnold Louis Chevallier, Llangarron, Ross, Hereford, England, assignor to Chevallier Self Loading Fire Arms, Limited, London, England Application April 4, 1933, Serial No. 664,402, and in Great Britain April 21, 1932

9 Claims. (Cl. 42—4)

The invention relates to rifles, shot guns and other small arms in which re-loading is effected by means of the recoil.

This method of re-loading is used both in automatic weapons which continue to fire as long as the trigger is kept in the firing position and in repeaters in which the trigger is actuated for each shot. The latter arrangement is of particular advantage in sporting guns, for example, since by its means the usual double-barreled gun may be superseded by a lighter weapon.

Two conditions are required for the satisfactory operation of such a weapon and these conditions have usually been considered to be mutually antagonistic. The first is a positive holding of the breech block up to its work during firing to prevent a blow-back and to use the whole weight of the weapon to take the recoil and thus impart as high a velocity to the projectile as would be the case with a single loader. The second condition is to provide for a free retreat of the breech block under the effect of the recoil to actuate the re-loading mechanism. The present invention provides means by which these apparently antagonistic conditions may be reconciled.

According to the invention a weapon of the kind referred to, i. e. one comprising a member adapted to move back under the effect of the recoil to carry out re-loading, is provided with means for using the initial force of recoil to hold the said member in the firing position in a positive manner supported by the inertia of a second member and for releasing the first member only when the recoil pressure has subsided to a suitable extent by permitting the second member to move up and back. This reduction of recoil pressure takes place after the projectile has left the muzzle by the release of the products resulting from the explosion of the charge. The release of the first member after this delayed interval of time has no effect on the projectile velocity and the use of inertia to hold it in position until the projectile is discharged makes it possible to ensure a positive lock and a release without undue friction.

In the preferred construction the breech block, which is adapted to move back under the effect of the recoil to re-load the weapon, bears against an intermediate member or "brace" which it itself supported against the fixed structure of the weapon, and means are provided for causing the second or inertia member to move the brace out of the way of the breech block at the appropriate time.

According to a further feature of the invention the second or inertia member is constructed as a cover over the mechanism. It lurches forward due to its own inertia on the initial recoil and thus backs up the locking action of the brace. On the further recoil movement it slides backwards and upwards to carry the brace out of the path of the breech block enabling the latter to retreat beneath it. The effectiveness of the cover or inertia member as a base of projection can be seen from an example. Supposing the initial lurch forward due to the first recoil movement is at a velocity of 20 ft. per second and the cover moves forward by 5 mm. and regains its relative speed of 20 ft. per second as it passes through its rest position on the rearward travel, then if the cover weighs 1 lb. it is equivalent as a base of projection to a stationary weight of about 375 lbs.

The rising of the cover has a further advantageous effect. It imparts to the weapon a vertical component of recoil tending to lift the breech and thus counteracts the usual tendency of the recoil to lift the muzzle end.

Advantageously the brace contacts against the fixed structure of the weapon by a surface or surfaces of such obliquity that at the high initial pressures jamming takes place, but on a partial release of the recoil pressure the brace is freed to be carried by the cover out of the way of the breech block. It has been found that the best angle of obliquity is about 71° to the direction of movement of the breech block.

The accompanying drawings show how the invention may be applied to various weapons, and therein Figure 1 is a section through the working parts of an automatic service pattern rifle loaded, Figure 2 is a corresponding plan with part of the cover removed, Figure 3 is a section corresponding to Figure 1 with the breech block at its rearward position during the re-loading, Figures 4 and 5 are elevations of the left and right hand sides respectively of the same parts, Figure 6 is a sectional plan on the line VI—VI of Figure 9, Figures 7 to 10 are transverse sections taken on the lines VII—VII, VIII—VIII, IX—IX, X—X respectively of Figure 1 looking towards the stock, Figure 11 is a part transverse section on the line XI—XI of Figure 4 showing the safety catch, Figure 12 is an elevation of the brace, Figure 13 is an elevation of the conveyor, Figures 14 and 15 are details, Figure 16 is an elevation of the rear abutment, Figure 17 is a section through the working parts of an automatic shot gun loaded, Figure 18 is a corresponding plan partly in section, Figure 19 is a section corresponding to Figure 17 with the breech block at its rearward position during the re-loading, Figures 20 and 20ᵃ together constitute an elevation of the right hand side of the same parts, Figures 21 and 21ᵃ together constitute an elevation of the left hand side of the same parts, Figures 22 to 24 are transverse sections taken on the lines XXII—XXII, XXIII—XXIII, XXIV—XXIV respectively of Figure 17 looking towards the stock.

Figure 25 is an elevation of the brace,

Figure 26 is an elevation of the conveyor, and

Figure 27 is a section through the working parts of a repeater shot gun as distinct from an automatic.

Dealing first with the rifle shown in Figures 1 to 16, a cartridge 1 is shown in Figure 1 ready for firing by means of the firing pin 2. The latter is slidably mounted in the breech block 3 and is brought into the firing position by the hammer 4 shown cocked in full lines and in the act of firing in chain-dotted lines. The hammer 4 is urged forward by the spring 5 on the rod 6 and is held by a front projection or "bent" of a slider 7 acting on a detent 8 on a boss of the hammer 4. The trigger plate 13 has an upwardly extending lug 9 which forms a guide for the rod 6 and also for a second rod 10 carrying a spring 11 bearing against a lug 12 which is also formed on the trigger plate 13. The slide 7 is normally urged by the spring 11 acting through the rod 10 on the arm 19 pivoted at 18 and the detent 43 to hold the hammer 4 in its full line position. But the nose 14 of the trigger 15 pivoted at 16 contacts with the sear 17 which is pivoted at 18 on the slide 7 and is integral with the arm 19. As the trigger is pulled the nose 14 pushes the sear 17 forward and since the detent 43 prevents the sear 17 from being depressed the slide 7 is forced forward releasing the hammer 4.

On firing, the breech block 3 is locked in the firing position by contacting with the end of the brace 20 shown separately in Figure 12. The brace is suspended inside an inertia member 27 constructed as a cover over the mechanism. The suspension is by means of a dovetailed groove 34 shown in Figure 7 and a rod 62 passing from front to back of the cover. The brace 20 is thus capable of sliding horizontally in relation to the cover 27 but is constrained to participate in its vertical movement. It will be shown subsequently that at the appropriate time the cover 27 rises and so carries the brace 20 upwards disengaging its forward face from the rear face of the breech block 3. For transmitting the rearward pressure on the breech block to the fixed structure of the weapon the brace has oblique surfaces 21 set at an angle of about 71° to the longitudinal axis and these contact with corresponding surfaces on the action sides 22, 23. The wings carrying the oblique surfaces 21 may if desired be extended downwards as shown dotted in Figure 12. By means to be described subsequently the inertia cover 27 carries out a movement in a horizontal direction only during the initial period of recoil. It therefore prevents the brace from moving upwards during this period, constituting a positive lock. Moreover, due to the high recoil pressure during this period, the surfaces 21 jam against the corresponding abutment surfaces, assisting the positive locking by means of the cover 27. Further support of the breech block is afforded by accumulator springs to be described subsequently and by an upward projection 44 at the rear end of the firing pin which engages in the firing position the end of a recess 45 on the brace. Now although in previous constructions the reduction of pressure on oblique surfaces was relied on to effect the unlocking of the breech block, this unlocking is effected in a positive manner by means of the present invention and the preferred construction for this purpose will now be described.

The breech block 3 comprises a part 24 which I term the conveyor. This is shown separately in Figure 13. An accumulator spring 25 urges the conveyor backwards in the breech block. A spring 26 which also bears on the front part of the conveyor but in the opposite direction tends to keep the firing pin 2 withdrawn until the hammer 4 comes into action. The inertia cover 27 already referred to has depending fingers 28 at its forward end which contact with the rear end of the conveyor. Four pins 29 in the sides of the cover 27 project inwards to engage slots 30 in the action sides. The forward part of these slots from the rest position of the pins 29 is horizontal and the rearward part slopes upwards. The drawings show the two slot parts straight, but curved slots may also be used provided there is a sufficient rise of the rearward part. Thus at the first shock of recoil the rifle with the breech block 3 and the brace 20 behaves as a solid member, but the cover 27 lurches forward in relation thereto compressing a second accumulator spring 31 which bears against the rear end of the brace. The inertia of the conveyor 24 gives it a tendency to move similarly and compress the accumulator spring 25 but this movement is made more definite by the depending fingers 28 of the cover 27. The movement is limited by upward lugs 32 of the conveyor 24 coming into contact with shoulders 33 on the breech block.

The accumulator springs 25 and 31 now come into operation and start the cover 27 and conveyor 24 on their backward journey by overcoming their inertia. The cover passes through its rest position and commences to rise due to the slope of the slots 30. As it rises the fingers 28 move out of contact with the conveyor allowing it a free passage backwards. The accumulator spring 31 and a starting or kicking spring 91 are mounted on the rod 62 between the rear raised part of the brace and the rear and front respectively of the cover. By the backward movement of the cover up the rising rear part of the slots 30 the brace is lifted so as to slide back along the oblique surfaces 21 and at the same time the starting spring 91 is compressed owing to the fact that the slope of the oblique surfaces 21 is much steeper than that of the rearward part of the slots 30. Moreover there are oblique surfaces 139 at the rear end of the brace which assist in resisting the initial recoil, but as these surfaces are of slightly greater inclination than the surfaces 21 there is no tendency to jam. The cover 27 is limited in its rearward movement not by the ends of the slots 30 but by abutment surfaces 92 contacting against corresponding surfaces 93 cut in the action sides 22 and 23. These abutment surfaces are cut from the solid metal and completely obviate any risk of the cover flying backwards and injuring the user. Such an accident might occur if reliance were placed on the pins 29 alone for limiting the movement of the cover. Clearly the cover must be assembled from the front when constructing the rifle.

By the time the breech block is freed by the raising of the brace the projectile has left the muzzle and any movement of the breech block now can have no effect on the projectile velocity. Clearly the breech block has been held rigid with the weapon by the combined effects of the brace and the inertia cover for the period of time necessary for starting the projectile on its path and for preventing any blow-back.

There is however still pressure in the barrel due to the explosion tending to drive the breech block backwards. This is a part of the phenomenon included in the general term "recoil" and I have found that it is of sufficient magnitude to drive the breech block to its rearmost position as shown in Figure 3 against the pressure of a recuperator spring 35 which bears against a plate or stern-post 36, itself supported by a rear abutment 37. In carrying out this movement the hammer 4 is moved back to the position of Figure 3 against the tension of spring 5 by the lower part of the rear end of the firing pin and is held there as will be described subsequently.

An extractor 38 on the breech block catches the rim of the spent cartridge 1 ensuring its extraction and as the front end of the cartridge case clears the barrel a spring-urged ejector 39 acting at the lower side of its rear face throws it upwards out of the top of the breech clear of the user. The breech block in carrying out this movement slides along grooves 40 cut right along the action sides to the stock end. By continuing these grooves to the rear end provision is made for removing the breech block for inspection as will be described hereinafter.

The retreat of the breech block allows the next cartridge 1a to be pressed upwards by the usual spring 41 from the magazine 42 ready to be pushed home into the breech end of the barrel. The breech block returns to the firing position under the influence of the recuperator spring 35 immediately after completing its rearward movement and returns to the firing position with the fresh cartridge at 1 as shown in Figure 1. When the breech block is in place the starting spring 91 returns the cover 27 to its rest position ready for the next shot.

The firing pin 2 has its movement limited by a pin and slot arrangement 46, but the jerk occasioned by the arrival of the breech block in the firing position would be liable to allow the pin to lurch forward and fire the cartridge. To prevent this a bent lever 47 pivoted at 48 to the magazine casing engages a groove 49 running the whole length of the bottom of the breech block and conveyor and also along part of the bottom of the rear end of the firing pin. When the lever 47 is in the normal position to which it is urged by a spring 50 it just catches the end of the groove in the firing pin head and holds the pin 2 in its withdrawn position. The lever 47 thus has to be moved out of engagement with the slot 49 before firing takes place and this is accomplished by the hammer 4 contacting with the lower end of the lever 47 during the firing movement as shown by the chain-dotted lines.

A safety device is provided as shown in Figure 11 comprising a rod 51 journaled in the action sides. This rod is so located as to prevent the hammer 4 from contacting with the firing pin 2 but it has a flat of such dimensions that the hammer can carry out its function when the rod is turned with the flat facing the hammer. A handle 52 as shown in Figure 4 serves to turn the rod into the firing position shown in full lines and the safety position shown in dotted lines. The boss of the handle 52 is formed as a cam so that in the safety position a plunger 53 is raised against the pressure of a spring 54 so that its upper end enters a notch 55 in the depending edge of the cover 27 and locks it.

It is necessary to lock the hammer 4 out of action until the cover 27 has returned to its normal position ready for firing. For that purpose the cover has at one side a slot 56 cooperating with a lever arm 57 lying within the slot and pivoted at 63. During the forward lurch of the cover the clearance behind the lever arm 57 leaves the latter unaffected, but as the cover moves back and up behind its rest position it carries the arm 57 with it rotating a crank 58 fast with the arm 57 in a counterclockwise direction in the view of Figure 1 and bringing a pawl 59 into the path of a lug 60 on the rod 6. The crank and pawl are shown separately in Figure 15. When the rear end of the firing pin on its rearward journey pushes the hammer 4 back and with it the rod 6, the lug 60 passes the pawl 59 and thus the hammer 4 is locked out of action till the cover returns to its normal rest position. A cover 61 protects the lever arm 57 where it lies below the edge of the cover 27. A chamfered projection 97 is provided on the lower surface at the rear end of the firing pin which presses the hammer into the position of Figure 3. Thus during practically the whole movement of the breech block in both directions the hammer is held clear of its underside by the pawl 59, obviating friction. A spring 64 engaging the pivot boss 63 as shown in Figure 14 tends to return the crank 58 to the position in which the rod 6 is free to actuate the hammer 4.

This return of the crank cannot however take place until the breech block 3 on its arrival at the firing position with the conveyor 24 allows the cover 27 to descend by moving from under the forward depending fingers 28 of the cover.

Since a reliance on this feature to ensure correct operation would involve serious friction between the depending fingers 28 and the returning breech block, a lever 68 is provided which is shown particularly in Figure 6. This lever is pivoted to the action side 22 at about the centre of its length and has a ramp 69, 70 at either end projecting into the path of the breech block and conveyor. Figure 6 shows the breech block in the loaded position with the ramp 69 pushed back. As soon as the breech block 3 commences its rearward movement it releases the ramp 69 and the firing pin presses the ramp 70 out of its path. A projection 71 on the other side of the lever 68 then enters a depression 72 in the cover 27 which by this time has moved back to its rearmost position. The cover is thus locked in this position until the breech block 3 on return to the loaded position catches the ramp 69 and moves the lever 68 back to the position of Figure 6. A spring may be fitted to the lever 68 urging it to the position in which it locks the cover 27. It is also possible to provide the lever 68 with a lug serving as ejector.

A further control and safety device is a pin 65 having a depression 66 formed in it to engage a projection 67 at the back of the trigger 15. In the free position the projection 67 fits into the depression 66. The pin 65 is adapted to slide in the direction of its own axis to the safety position where its cylindrical surface engages the projection 67 preventing the trigger 15 from being pulled. The pin 65 also has a third position in which a depression shallower than the depression 66 cooperates with the projection 67. In this position the trigger is prevented from making its full stroke so that the nose 14 maintains contact with the sear 17 and the slide 7 remains in its forward position with the bent clear of the detent 8. The rifle is then automatic and continues to fire so long as the trigger remains under pressure.

By moving the pin 65 to the position in which the trigger can execute its full movement, a pull on the trigger will bring the nose 14 past the sear 17. Thus after one shot the slide 7 returns under the influence of the spring 11 and the bent acting on the detent 8 keeps the hammer 4 cocked. If the trigger is now released the nose 14 pushes the sear 17 upwards comprising the spring 11. A click as the sear 17 springs back to position against the detent 43 indicates that the rifle is ready for the next shot, when the same sequence of operations can be repeated.

Access to the mechanism is obtained by opening the rear abutment 37 which is hinged at 73. The abutment is shown separately in Figure 16. At the upper part and sides of its front surface it supports the rear plate 36 which takes the thrust of the retreating breech block partly direct and partly through the recuperator spring 35. The abutment has projections 98 on both sides which drop into corresponding recesses 99 in the action sides to transfer the thrust to the main structure. Other projections 100 are provided to close the ends of the grooves 40. For the purpose of locking the abutment a slider 74 is provided to slide horizontally in it. A spring 75 pressing against the rear plate 36 urges the slider 74 backwards so that a toe 76 engages a corresponding part 77 integral with the fixed part of the rifle. To open the abutment a separate pin is inserted in a hole 78 to push the slider 74 forward till the toe 76 clears the projection 77 and the abutment can be hinged back.

If it is desired at any time to use the rifle as a single loader a vertically sliding catch 79 is provided which can be pushed up to engage a notch 80 in one of the depending edges of the cover 27. This stops all movement of the cover and accordingly locks the breech block in its forward position.

For reloading under this condition it is necessary to actuate the reloading mechanism by hand. For this purpose a slide 81 is provided having a handle 82. After releasing the catch 79 the slide is drawn back. First the sloping forward edge of a lug 83 at the rear end of the slide contacts with the cover 27 pushing it back and up to its reloading position in which the slide can pass under its depending edge. A second slide 84 within the action sides is also fast with the handle 82. This slide 84 has a raised heel 85 which catches the end of a depressed part 86 of the breech block to withdraw the latter. There is however sufficient lost motion to allow the cover 27 to reach its top rear position before the breech block moves. An extension 87 of the slide 81 serves as a dust cover over the slot 88 which is necessary for the cooperation of the two slides 81 and 84.

The backward movement of the slides is limited by a downward projection 94 on the edge of the cover contacting with the lug 83. A notch 95 immediately in front of the projection 94 serves as a catch to hold the slides in their rearmost position. A slight amount of vertical play in the raised position of the cover permits the lug 83 to drop into the notch 95. The holding open of the breech mortice in this way is also of use for cooling the barrel after a spell of automatic or repeater firing.

If the magazine is in use a fresh cartridge is brought into place as in the case of automatic reloading and the slides are allowed to return under the influence of the recuperator spring 35 by slightly lifting the cover 27. On the other hand should the magazine be empty due either to the cartridges all having been fired or to the intention to load by hand, the cartridge platform 89, having no cartridge on it, springs up into the path of the breech block holding the latter in its rearward position. With hand loading it is necessary after placing the new cartridge in the barrel to release the pressure of the recuperator spring 35 on the cartridge platform 89 by pulling the handle 82, when the weight of the cartridge will depress the platform 89. The breech is then closed as before by lifting the cover 27 slightly. A ball and spring arrangement 90 serves to define the forward position of the slide and prevents rattle.

The cartridge platform 89 also obstructs the return of the breech block 3 in the manner described above if the magazine 42 becomes exhausted in automatic or repeater firing. The indication is then made evident to the user by the fact that the cover 27 remains in its raised position and obstructs the line of sight. This is due to the fact that the cover cannot resume its normal or firing position until the breech block is home.

When it is desired to open the rifle for examination or cleaning the cover 27 is first raised and for holding it there provision is made for the catch 79 to be moved to a higher position than that described above so that it engages the end of the depending edge of the cover 27. The rear abutment is then opened as mentioned above. The stock and trigger plate can then be hinged about the pivot 96 in relation to the barrel and magazine. The removal of the abutment leaves the way clear for the breech block, conveyor, firing pin, recuperator spring and rear plate to slide out. These parts can then be placed in the user's pocket and any cleaning or adjustment undertaken. There is a clear sight through the barrel from the breech end so that axial cleaning can be undertaken in the correct manner. The parts of the mechanism remaining in the rifle are easily accessible for adjustment or cleaning and the breech block and its associated parts are entirely separate.

Figures 17 and 26 show a shot gun which can be operated as either an automatic or a repeater. Parts similar to corresponding parts in the rifle of Figures 1 to 16 have the same references. A great advantage in using such a gun as an automatic is that the trigger can be depressed long enough to fire two rounds in rapid succession, while the gun is kept following the bird; thus an elongated pattern of shot is obtained which makes it easier to bring down the game.

The magazine 101 is of the usual cylindrical type mounted below the barrel. Figure 17 shows a cartridge 1 in position ready for firing and the next cartridge 1a on the spoon described hereinafter ready for being fed into place by means of the recoil when the cartridge 1 is fired. The cartridge 1b which follows 1a is at the rear end of the magazine ready to be fed in its turn on to the spoon. The firing pin 2 is slidably mounted as before in the breech block 3 and is brought into the firing position by the hammer 4 shown cocked in full lines and in the action of firing in chain-dotted lines.

The hammer 4 is actuated by means of the rods 6 and 10 through the sear 17 and nose 14 of the trigger 15 in an exactly similar way to the rifle shown in Figures 1 to 16. As in the previous case a pin 65 is provided for locking the trigger out of action or for automatic or repeater firing.

On firing, the breech block 3 is locked in the firing position by contacting with the end of the brace 20 shown separately in Figure 25. As before the brace has oblique surfaces 21 contacting with corresponding surfaces on the action sides 22, 23. The firing pin has an upward projection 44 as before engaging in the firing position the end of a recess 45 on the brace.

The conveyor 24 shown separately in Figure 26 is a little different in shape from the conveyor of the rifle. The recess at the back of the conveyor accomodates the head of the firing pin, and the rear faces of these two parts are flush when the hammer has pressed the pin forwards for firing and also when the breech gear is at its extreme rear position. The conveyor has upstanding lugs 32 at either side contacting with the depending fingers 28 of the cover 27. These fingers are shaped to fit the recess 102 at the rear end of the conveyor of which the rear ramp is of such slope that the fingers 28 can retreat obliquely upwards while the conveyor remains stationary. At the same time during the retreat of the cover from its extreme forward position to its rest position the fingers 28 maintain their engagement and serve to draw the conveyor back even if the accumulator spring should fail. Projections 113 on either side serve to guide the conveyor in the breech block.

The cover 27 is of similar construction to that previously described having four pins 29 engaging slots 30 in the action sides. The brace 20 is again suspended from the cover 27 by a dovetailed groove 34. On the first forward lurch of the cover 27 the conveyor 24 is moved forward by the lugs 32 which then come into contact with the end 103 of the breech block, so supporting the action of the extended portion 104 of the brace which is already in contact with this same surface. The recuperator spring 35, the accumulator springs 25, 31, the starting spring 91 and the spring 26 tending to hold the firing pin away from the cartridge will be recognized in the present figures. The operation of these parts is precisely similar to that above described. The stern post 36, rear abutment 37 and slider 74 are also of similar construction to that of the rifle.

To suit the different type of magazine the cartridge feed is altered as compared with the rifle previously described. A bell-crank lever pivoted at 105 constitutes a spoon feed by means of the long arm or spoon 106 which in its lower position drops below the inner periphery of the magazine 101. The short arm 107 of this bell-crank lever is caught by a projection 108 at the bottom of the conveyor when the breech block and its associated parts are in the rearmost position. This impact drives the arm 107 into a small recess in the stern post 36 against the action of a spring 138, which also serves as a return spring for the trigger 15, and the long arm 106 is raised, bringing the forward end of the cartridge flush with the barrel, so that as the breech block returns it will push the cartridge home. Figure 19 shows the breech block withdrawn and the spoon 106 in the raised position.

During its movements upwards and downwards the spoon 106 passes a pair of gates 115 which are spring-urged inwards to hold the next cartridge in the magazine. On the downward travel a cartridge is fed into the spoon, but on the upward travel the cartridge already there prevents the next cartridge from moving forward while the gates are opened. To empty the magazine buttons 116 are provided which can be depressed to spring the gates 115 apart.

To prevent the spoon from dropping below the position shown in Figure 19 due to the spring 138 when the breech block commences its return journey, a lever 117 with a hook end is provided which is spring-urged to engage the long arm 106. The lower side of the hook end is chamfered so that as the spoon rises it pushes the lever aside but so long as the lever is held with its point extended into the path of the arm 106 the latter cannot fall to the position of Figure 17. The top end of the lever 117 is provided with a stud 118 engaging a sloping depression 119 in the cover 27. When the cover is raised the stud can enter the depression and thus the lever 117 is free to engage the arm 116, but when the cover returns to the firing position the engagement of the stud 118 with the inside of the cover keeps the bottom end of the lever 117 out of the path of the spoon 106 in the position shown in Figure 23.

To prevent the breech block from returning when no cartridge is available the centre part 111 of the spoon 106 is hinged at 109 and is provided with a raised heel 110; a light spring urges this centre platform 111 upwards but the weight of the cartridge is sufficient to depress it. When the heel 110 is raised it catches the front end of the breech block and prevents it from returning to its position.

To prevent the heel 110 from catching the front end of the conveyor during the travel of the breech block after the platform 111 is relieved of the weight of the cartridge, an extension 112 is provided on the underside of the conveyor engaging a corresponding gap of the breech block so that a continuous support is given for the heel 110 while the breech block is travelling forwards and it does not therefore catch between the conveyor and the breech block.

The breech block is provided with an extractor 38 to engage the rim of the spent cartridge; on withdrawal of the cartridge case ejection is effected to the right-hand side.

Operation of the re-loading mechanism by hand is provided for as in the case of the rifle by a combination of two slides 81 and 84 actuated by a handle 82 on the left-hand side of the gun. The projection 83 on the slide 81 engages a raised part 114 on the cover lifting it as in the case of the rifle previously described.

For the sake of those accustomed to the old type of hand loading mechanism a handle 120 is provided which is slidable in the usual way on the magazine 101. A pivoted spring 121 on each side is normally in engagement with one or other of two depressions 122 but can be lifted out of engagement by pressure on a button 123; the handle 120 is thus normally held in either of two positions. A rearward slide 124 is connected to the handle 120 and contacts with the end of the slide 84. A backward pull on the handle 120 has the same effect therefore as a pull on the handle 82 and moreover the breech block and other parts may be locked in the withdrawn position by allowing the spring to engage the rear depression 122. At the same time operation of the slides 81 and 84 by the handle 82 will not affect the handle 120, and similarly the automatic movement of the breech gear under the effect of recoil will not affect either the slides 81 and 84 or the handle 120.

The gun opens precisely as in the case of the rifle, the two parts being hinged together at 96. The other parts have not been specifically described but their construction and operation will be clear from the drawings and the description of the rifle.

A shot gun is shown in Figure 27 which is adapted for use as a repeater only and not as an automatic and here again corresponding parts have the same references. The principal features are as already described including the cover 27, brace 20, conveyor 24, and breech block 3 with their various springs, except the spring numbered 26 in Figure 1 and urging the firing pin backwards. The action of the recoil in effecting re-loading is precisely as fully described in connection with the rifle of Figures 1 to 16.

The cartridge feed is similar to that of the shot gun of Figures 17 to 26. The difference lies in the firing mechanism. The firing pin 2 on withdrawal of the breech block is caught by means of a notch 125 in its dependent rear flange 126 by a lever arm 127 urged upwards by a spring 128; the spring 129 urging the firing pin forwards thus remains compressed. A recess 140 formed inside the cover 27 in line with the recess 45 in the brace 20 assists in guiding the firing pin in its longitudinal movements. Meantime the breech block has compressed a recuperator spring not shown, but arranged similarly to the spring 35 in the previous figures. This spring returns the breech block to the firing position leaving the firing pin in the position shown in Figure 27, from which it is released for firing by slip trigger mechanism which will now be described. When the trigger 15 is pulled the arm 130 integral therewith draws the link 131 downwards, but the rear face of this link has a curved surface 132 contacting with a stationary abutment 133. Accordingly as the pivot 134 between the arm 130 and link 131 moves almost vertically downwards, the surface 132 moves downwards and forwards, and the top end of the link 131 is constrained to move forwards to a still greater extent. It has, however, in the meantime drawn the arm 127 downwards by means of a detent arrangement 135 and released the hammer.

A spindle 63 actuated by the cover exactly as in the case of Figure 1 has an arm 136 fitted to it so that when the cover is in the rear position a curved surface 137 on the arm 136 contacts with the top end of the link 131, and since this link cannot move unless its top end is allowed to move forwards, the trigger is locked so long as the cover remains in the rear position, that is until the gun is reloaded. It will be quite clear that a further shot cannot in any case be fired until the release of the trigger 15 allows the reengagement of the detent arrangement 135.

It will be clear that many other constructions of small arms including light machine guns may be produced which embody the present invention.

The following analysis of the phenomena observed in particular examples of weapons operating by means of an oscillating inertia member under recoil will serve to indicate the advantages obtained.

Assuming the velocity of the recoiling mass to reach 18-20 feet to the second (calculated over 3 inches of reactive motion) and the gun mass to weigh, say, 8.50 lbs., there is generated a momentum of 18×8.50=153 ft. lbs. or a recoil force equivalent to the weight of 170 lbs. static. This figure would appear to correspond with the strength of the accumulator spring (168 lbs.) employed in the old Sjögren rifle, in which it has been found possible to tension such a spring to capacity over 5 mm. of forward lurch.

This stored energy, upon reaction, was sufficient to throw the whole breech gear including the inertia weight 3 inches to the rear, whilst energizing a recuperator spring, which had a strength of some 30 lbs. static nearly.

These data would appear to prove to demonstration, that the momentum of the 8½ pounds mass may be resisted by an inertia weight of 1 lb. which really constitutes a temporary abutment and which only yields when the 170 pounds capacity limit has been exceeded. Besides, the sudden check offered to the recoil speed and its subdivision into two directions have the beneficial effect of converting a large proportion of this energy into heat.

In the combination making use of the new scheme of oscillating weight the associated members, namely conveyor and inertia weight, retreat for the purpose of liberating the breech block and exposing the loading aperture for a distance of ¼ inch or slightly more, when they become separated, the inertia member or cover developing a vertical component of recoiling motion and sliding upwards along guide surfaces, so as to yield a free passage to the compound breech gear, in the process lifting the locking brace from its 71° abutment shoulders. It is to be assumed then that the 170 lbs. of reactive force are being partly utilized until the dissociation takes place, and that a residue of momentum remains in reserve to tilt the hammer, and carry the compound breech gear to the rearmost position underneath the inertia member or cover and bolt lock.

It has been deemed advisable, in order to accelerate the development of a vertical component of the longitudinal velocity, to equip the inertia cover with an accumulator spring of its own, which is stressed at the same instant as the forward one in such a manner that both tend to assist in lifting the associated members out of the path of the compound breech gear. The division of strength between these two springs has been set down empirically at 112 lbs. for the accumulator, housed in the forward part of breech block, and 56 lbs. for the auxiliary spring, located in the inertia member, (in all 168 lbs.) both these dynamic values being obtained over the same distance of lurch, viz, 5 mm. These factors, however, only deal with the reactive force derivable from the action under recoil of the inertia member.

It should be remembered that the breech block itself has imparted to it a velocity to the rear equal to the velocity of the whole gun mass. To this tendency to rearward movement, we must add an important factor which is bound to assert itself particularly with a low recoil speed, namely the thrust of the cartridge upon the face of the bolt.

Hence in order to throw the fastening open, we dispose of the following phenomena as factors, which if not altogether simultaneous in their effects, are known to be co-existent, and to act to a certain extent in unison, or rather in a strictly determined sequence.

1. The reactive energy of the two accumulators.
2. The acquired velocity of the bolt (compound breech gear) traceable to the general recoil speed.
3. An irregular action of the bottled up gases, more in evidence at low velocities of recoil.

We have seen that the brace which blocks the rear portion of breech gear is moved out of its path at a predetermined moment by the diagonally moving inertia cover.

Were the resistance shoulders of the brace wings however cut perpendicularly to the axial line, the whole duty of lifting would devolve upon the diagonal guide ways.

But these resistance shoulders are cut at an angle of 71° nearly. The peculiar properties of this inclination to the axis of thrust were discovered experimentally in 1913.

So long as a high pressure obtains, the surfaces in contact remain absolutely rigid as if "glued" together; but so soon as the powder pressure begins to subside, a tendency to slide upwards manifests itself; in the present system this upward urge is checked in its early stages by the intervention of the cover engaging in the longitudinal slots, and preventing any premature upward movement on the part of the brace. In addition, the brace is temporarily locked by the engagement of the firing pin.

It has been ascertained beyond the shadow of a doubt, that the lurch forward of the cover, by compressing in this instance, a powerful spring against the rear part of the brace, will always be instrumental in separating the surfaces in contact, viz, the rear part of the wings, firmly wedged against the resistance shoulders.

This urge forward, which precedes the opening movement and thus occurs before the brace can be lifted, admits of a smooth upward sliding motion, which precludes the grinding and abrasive effects of surfaces sliding against one another under a comparatively high pressure. A further disadvantage of weapons solely dependent on this phenomenon for their operation is that the fastening when worn or abraded yields to the thrust of the bolt without any adequate safeguard against a dangerous rise of pressure in the barrel. Such a rise of pressure would accelerate the liberation of the locking device, even before the bullet has left the muzzle. Under such defective conditions if the projectile should remain by accident jammed in the bore, the breech block would assume the duty of projectile with disastrous results.

In the event of an obstruction supervening in the bore of a weapon constructed according to the present invention which blocks the free passage of the bullet, an intensive and prolonged recoil effect obtains, with an attendant violent and continuing forward lurch of the cover, which operates thus to maintain the rigidity of the breech lock. This will in all probability entail a local burst in the barrel from which the operator may suffer some injury to his hand or arm, but his head at any rate will be immune.

Ballistic data exhibiting the balance of the forces at work show that the security of the closure is assured in all circumstances.

It is in the very nature of things that the variable time "lag", or safety interval increases in mathematical proportion to the recoil speed, but under normal conditions, it may be approximately computed from the following data.

Assuming the barrel to be 24 inches long, and the bullet to be driven at a speed of 2400 feet per second, rough and ready calculations would show that the projectile must reach a point some 3 feet in front of the muzzle at the moment when the inertia cover has regained its starting point or rest position. The projectile will have reached a distance of about 10 feet from the muzzle when the inertia cover has been lifted out of engagement and lies in a plane above the fastening to allow the breech block to pass underneath it.

What I claim is:—

1. A small arm of the kind re-loaded by means of the recoil comprising a breech block, a brace with an abutment co-operating with a corresponding abutment on the breech block, and with another abutment co-operating with a corresponding abutment on the fixed structure of the weapon, an inertia member connected to the brace in a longitudinally slidable manner and guiding means for the inertia member in a rearward and upward direction, the abutment on the brace being disengaged from the corresponding abutment on the breech block in the rearward raised position of the inertia member.

2. A small arm of the kind re-loaded by means of the recoil comprising a breech block, a brace with an abutment co-operating with a corresponding abutment on the breech block and with another abutment co-operating with a corresponding abutment on the fixed structure of the weapon, an inertia member connected to the brace in a longitudinally slidable manner and guiding means for the inertia member in a forward substantially horizontal direction and in a rearward and upward direction the abutment on the brace being disengaged from the corresponding abutment on the breech block in the rearward raised position of the inertia member.

3. A small arm of the kind re-loaded by means of the recoil comprising a breech block, a brace with an abutment co-operating with a corresponding abutment on the breech block and with another abutment co-operating with a corresponding abutment on the fixed structure of the weapon, an inertia member constructed as a cover over the mechanism and connected to the brace in a longitudinally slidable manner and guiding means for the inertia member in a rearward and upward direction the abutment on the brace being disengaged from the corresponding abutment on the breech block in the rearward raised position of the inertia member.

4. A small arm of the kind re-loaded by means of the recoil comprising a breech block, a brace with an abutment co-operating with a corresponding abutment on the breech block and with another abutment co-operating with a corresponding abutment on the fixed structure of the weapon, an inertia member connected to the brace in a longitudinally slidable manner, abutment shoulders cut from the solid on the inertia member co-operating to limit its movement with abutment shoulders cut from the solid on the fixed structure of the weapon, and guiding means for the inertia member in a rearward and upward direction, the abutment on the brace being disengaged from the corresponding abutment on the breech block in the rearward raised position of the inertia member.

5. A small arm of the kind re-loaded by means of the recoil, comprising a breech block, a recuperator spring behind the breech block, a conveyor mounted to slide forward into the breech block, an accumulator spring in front of the conveyor bearing on the breech block, an abutment on the conveyor co-operating when the accumulator spring is compressed with an abutment on the breech block, a brace having abutments co-operating in the firing position with abutments on the breech block and on the fixed structure of the weapon respectively to hold the breech block positively in the firing position, an inertia cover with a forward abutment co-operating with an abutment on the conveyor, guiding means for the cover in a substantially horizontal forward direction from the firing position and in a rearward and upward direction therefrom, connecting means slidable in a longitudinal direction between the cover and the brace, an accumulator spring between a rearwardly directed surface of the cover and the brace and a starting spring between a forwardly directed surface of the cover and the brace, the abutments between the cover and the conveyor and between the brace and the breech block being disengaged in the rearward raised position of the cover.

6. A small arm of the kind re-loaded by means of the recoil, comprising a breech block, a brace with abutments co-operating in the firing position with abutments on the breech block and on the fixed structure of the weapon respectively to hold the breech block positively in the firing position, an inertia cover connected to the brace to permit relative sliding in a longitudinal direction only, guiding means for the inertia cover in a rearward and upward direction, the co-operating abutments of the brace and breech block being disengaged in the rearward raised position of the inertia cover, and a lever provided with a projection at its rear end located to engage a depression in the cover when the latter is in its rearmost raised position and with two ramps at its ends at a distance apart just exceeding the length of the breech block and located selectively to engage the breech block.

7. A small arm of the kind re-loaded by means of the recoil, comprising a breech block, a brace with abutments co-operating in the firing position with abutments on the breech block and on the fixed structure of the weapon respectively to hold the breech block positively in the firing position, an inertia cover connected to the brace to permit relative sliding in a longitudinal direction only, guiding means for the inertia cover in a rearward and upward direction, the co-operating abutments of the brace and breech block being disengaged in the rearward raised position of the inertia cover, a firing pin slidably mounted in the breech block, a spring between a forwardly directed surface of the firing pin and a rearwardly directed surface of the breech block, a hammer located to strike the rear end of the firing pin and a projection on the firing pin operating to cock the hammer as the breech block carries the firing pin rearwards.

8. A small arm of the kind re-loaded by means of the recoil comprising a breech block, a brace with abutments co-operating in the firing position with abutments on the breech block and on the fixed structure of the weapon respectively to hold the breech block positively in the firing position, an inertia cover connected to the brace to permit relative sliding in a longitudinal direction only, guiding means for the inertia cover in a rearward and upward direction, the co-operating abutment of the brace and breech block being disengaged in the rearward raised position of the inertia cover, a firing pin slidably mounted in the breech block, a spring between a forwardly directed surface of the firing pin and a rearwardly directed surface of the breech block, a hammer located to strike the rear end of the firing pin and co-operating abutments on the firing pin and the brace located to be in contact when the firing pin is in its forward position in the act of firing.

9. A small arm of the kind re-loaded by means of the recoil comprising a breech block, a brace with abutments co-operating in the firing position with abutments on the breech block and on the fixed structure of the weapon respectively to hold the breech block positively in the firing position, an inertia cover connected to the brace to permit relative sliding in a longitudinal direction only, guiding means for the inertia cover in a forward substantially horizontal direction and in a rearward and upward direction, the co-operating abutments of the brace and breech block being disengaged in the rearward raised position of the cover, a locking slider having a projection co-operating with a notch in the cover to hold the cover in the firing position and with the forward end of the cover to hold the cover in its rearward raised position.

ARNOLD LOUIS CHEVALLIER.